United States Patent
Sherman et al.

(10) Patent No.: US 9,449,064 B2
(45) Date of Patent: Sep. 20, 2016

(54) SYSTEM AND METHOD FOR DYNAMIC AND SECURE COMMUNICATION AND SYNCHRONIZATION OF PERSONAL DATA RECORDS

(71) Applicant: Pinplanet Corporation, Paramus, NJ (US)

(72) Inventors: Jonah Sherman, New Nork, NY (US); Craig H. Sherman, New York, NY (US); Jeffrey Cordover, Tenafly, NJ (US); Vishal Singh, Princeton, NJ (US)

(73) Assignee: Pinplanet Corporation, Paramus, NJ (US)

( * ) Notice: Subject to any disclaimer, the term of this patent is extended or adjusted under 35 U.S.C. 154(b) by 17 days.

(21) Appl. No.: 14/703,599

(22) Filed: May 4, 2015

(65) Prior Publication Data

US 2015/0319157 A1    Nov. 5, 2015

Related U.S. Application Data

(60) Provisional application No. 61/988,178, filed on May 3, 2014.

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *H04L 29/08* | (2006.01) | |

(52) U.S. Cl.
CPC ... *G06F 17/30575* (2013.01); *G06F 17/30215* (2013.01); *H04L 29/06* (2013.01); *H04L 63/083* (2013.01); *H04L 63/20* (2013.01); *H04L 67/02* (2013.01); *H04L 67/1095* (2013.01); *H04L 67/306* (2013.01); *H04L 67/18* (2013.01); *H04L 67/26* (2013.01)

(58) Field of Classification Search
CPC .................. G06F 17/30575; G06F 17/30215; H04L 26/06; H04L 63/083; H04L 63/20; H04L 67/02; H04L 67/26; H04L 63/1095
USPC ............................................................ 726/7
See application file for complete search history.

(56) References Cited

U.S. PATENT DOCUMENTS

| | | |
|---|---|---|
| 6,820,204 B1 | 11/2004 | Desai |
| 8,185,932 B2 | 5/2012 | Dunn |
| 8,224,725 B2 | 7/2012 | Grim |
| 8,364,711 B2 | 1/2013 | Wilkins |
| 2008/0022414 A1 | 1/2008 | Cahn |
| 2009/0187979 A1 | 7/2009 | Sever |
| 2010/0224678 A1 | 9/2010 | Duk |
| 2011/0010563 A1 | 1/2011 | Lee |
| 2011/0238482 A1 | 9/2011 | Carney |
| 2012/0054680 A1 | 3/2012 | Moonka |

FOREIGN PATENT DOCUMENTS

DE    102007060677 A1    6/2009

OTHER PUBLICATIONS

G. Bartolomeo; Handling User Profiles for the Secure and Convenient Configuration and Management of Mobile Terminals and Services; Journal Article; 2005; IEEE Computer Society.

*Primary Examiner* — Monjour Rahim
(74) *Attorney, Agent, or Firm* — Adams Grumbles, LLP; Brittany Nanzig

(57) ABSTRACT

A system and method for dynamic and secure communication and synchronization of personal data records through a distributed network. More specifically, a system that receives, stores and secures personal data records for users and then transmits and synchronizes personal data records between users in a distributed network based on rule-based security controls.

13 Claims, 5 Drawing Sheets

US 9,449,064 B2

SYSTEM AND METHOD FOR DYNAMIC AND SECURE COMMUNICATION AND SYNCHRONIZATION OF PERSONAL DATA RECORDS

CROSS-REFERENCE TO RELATED APPLICATION

This application claims the benefit of U.S. Provisional Application No. 61/988,178 filed May 3, 2014, titled System and Method for Dynamically & Securely Updating & Synchronizing Contact Information.

FIELD OF THE DISCLOSURE

The disclosed invention relates to, among other things, replication of information between databases. More specifically, when a user updates his, her, or its personal data records, the system replicates the update within the databases of all other users who are connected to the user.

BACKGROUND OF THE INVENTION

When individuals meet, they often wish to stay in contact with each other and, therefore, exchange contact information such as phone numbers, emails, work addresses, etc. However, exchanging personal and business contact information, storing that information into an electronic address book, and maintaining the address book up to date has not evolved, in spite of significant strides in mobile and web technologies. For example, when two people exchange information, they can only keep the information provided to each other from that specific point in time. If one of the individual's contact information changes, there is no way for the other person to know outside of the first individual reaching out and informing the second individual. Therefore, a system is needed that can push updated contact information to individuals that a person has previously connected with.

SUMMARY OF THE INVENTION

The disclosed system solves address book maintenance problems by facilitating the exchange of information and inverting the way address books currently function. The system receives, stores and secures personal data records for users and then transmits and synchronizes personal data records between users in a distributed network based on rule-based security controls.

For example, the disclosed system shifts the onus of inputting and maintaining up-to-date contact information to the owners of that information, i.e., the contacts themselves, instead of the user on whose device the address book is residing. As a consequence of this paradigm, the address book can now serve a targeted advertising role whereby businesses and professional service providers can "push" information into the address book according to the user's preferences and permissions.

DETAILED DESCRIPTION

Figure 1:
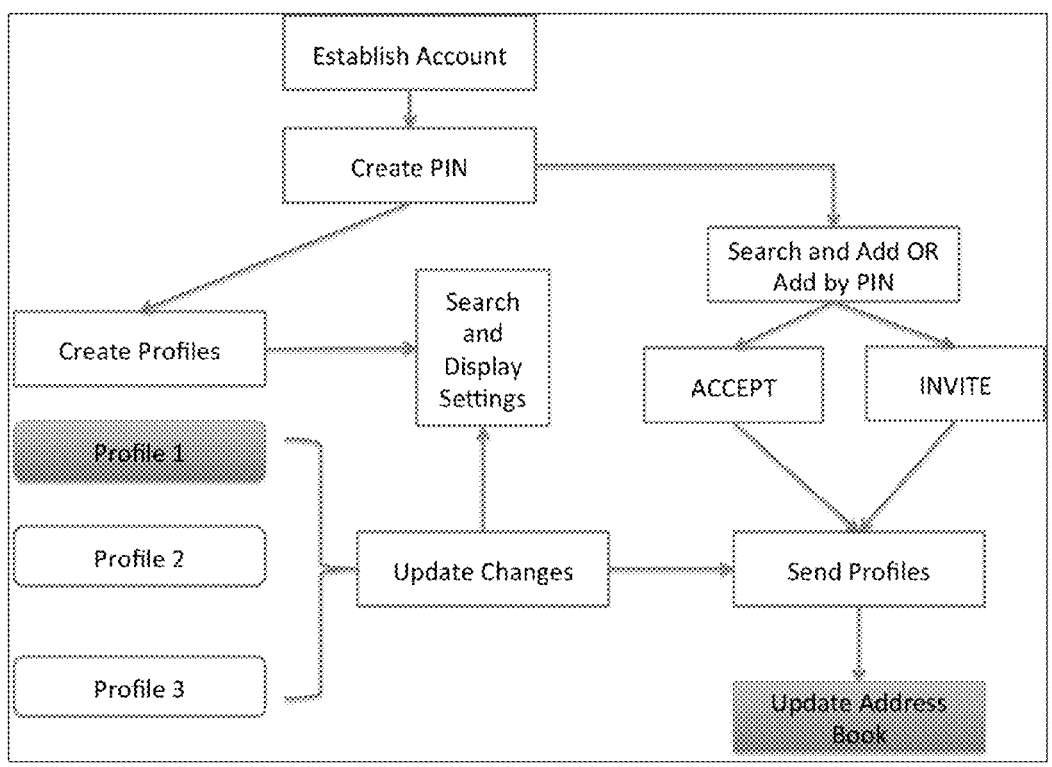
FIG. 1 illustrates a flow diagram according to one embodiment of the disclosed system.

Various user interfaces and embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover application or embodiments without departing from the spirit or scope of the claims attached hereto. Also, it is to be understood that the phraseology and terminology used herein are for the purpose of description and should not be regarded as limiting.

SUMMARY

Exchanging personal and business contact information, storing that information into an electronic address book, and maintaining the address book up to date has not evolved, in spite of significant strides in mobile and web technologies. The disclosed system solves this problem by facilitating the exchange of information and giving control of the information to users ("crowd sourcing") by inverting the way address books are currently maintained. For example, the disclosed system shifts the onus of inputting and maintaining up-to-date contact information to the owners of that information, i.e., the contacts themselves, instead of the user on whose device the address book is residing. As a consequence of this paradigm, the address book can now serve a targeted advertising role whereby businesses and professional service providers can "push" information into the address book according to the user's preferences and permissions.

The disclosed system represents a novel methodology for secure and selective contact information exchange that also enables improved targeting advertising opportunities by linking advertising and promotional material to the specific content of a user's contact list. This advertising can then be further disseminated through the user's social media outlets. The utility has both fixed website and mobile components which have broad applications in other aspects of ecommerce, retail, print advertising, TV advertising, radio advertising, and corporate human resource functionality.

Traditional Connection

The disclosed system creates a crowd-controlled and automatically updatable address book where information about a contact is managed by the contact itself. As described below, there are three primary steps to the solution. First, two users exchange pivotal PIN information leading to establishment of a connection so that the users become mutual contacts. Second, the contacts selectively share their user profiles. Third, changes each user makes to his or her personal profile can automatically be pushed to the address book of those who have the user listed in their contacts.

More specifically, the first step involves users exchanging a unique PIN, whereby one user can then initiate an invite to a second user, the second user can be notified about the invite, and then the second user can accept or decline the invite. When an invite is sent and accepted, the invite can create a connection regardless of whether any contact information is exchanged. Users can subsequently share one or more user-defined profiles with their connections and update the shared profiles at any time. Changes or updates to profiles can then be automatically synced to the address book of the connections.

Figure 2:
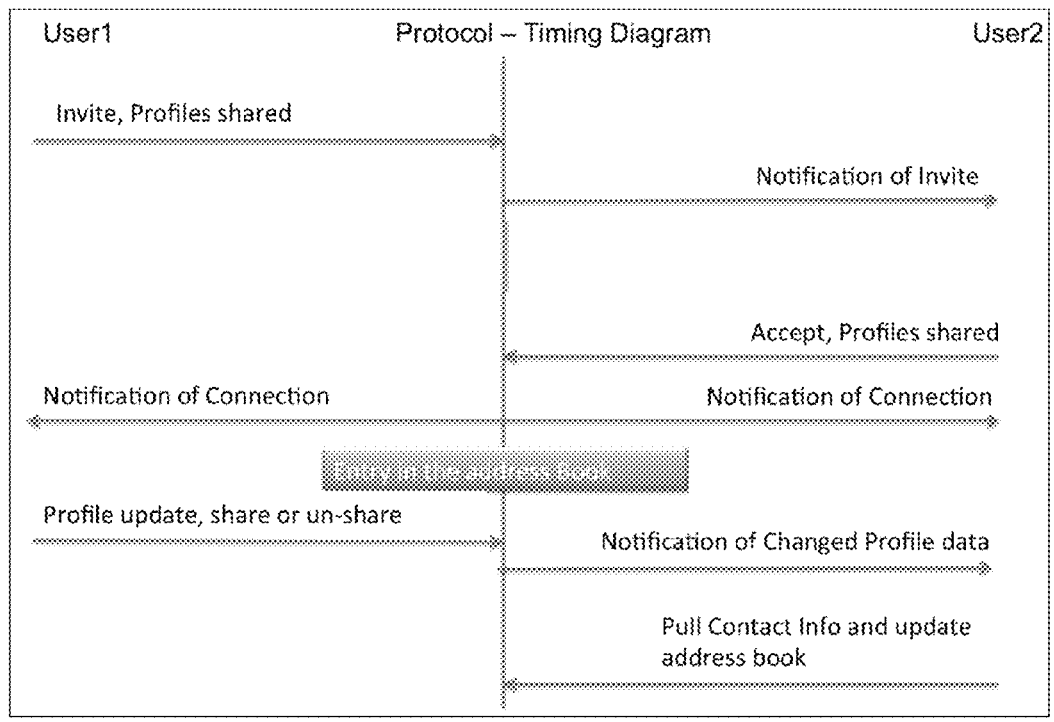
FIG. 2 is a timing diagram illustrating the order in which connections are made and established according to one embodiment of the disclosed system.

In one example, as illustrated in FIG. 2, USER1 and USER2 meet and wish to share their contact information. To exchange their respective information, one of the users initiates the contact information exchange. For example, USER1 initiates the data exchange and requests USER2's contact information by entering USER2's PIN into the system. USER1 is, therefore, sending an Invite Request, which is an outbound request. USER1 offers the profile that he or she wants to share with USER2, and, by viewing the profile, USER2 can learn about USER1 and use this information to decide whether to accept or reject the invite.

When USER1 sends an Invite Request to USER2, USER2 receives a Notification, an inbound request, stating that USER1 wants USER2's contact information. If USER2 accepts the request, contact information selected by USER2 will be automatically uploaded to USER1's contact list. USER1 will then receive a Notification about the connection being established and will receive USER2's information. If USER2 accepts, USER1's preselected information will be automatically downloaded into USER2's contact list. Each user can preselect which profiles and contact information to share. Alternatively, each user can choose the information to be shared "on the fly." However, any user can reject any request for their contact information, in which case no information will be shared. A history of contacts accepted and rejected can be stored and accessible by any user. In addition, the specific profile and contact information shared by the user is also stored and available for review.

This data trail helps remind the user which information was sent to whom and when. For example, if USER1 initially shares his or her work information with USER2 and, after a time, they become social friends, USER1 can recall the history of the initial data exchange and then proceed to send additional social and other personal contact information to USER2 without repeating what was already sent. USER2 in this interaction is notified of the new information added to his contact list, but is not obligated to send any return information. This new data exchange can be recorded, timed stamped, and accessible by both users for review at a later time. Subsequently, any changes in the previously exchanged profiles are automatically updated to the recipients without any action from sender or receiver.

Alternative Connections

In one embodiment, a subset of the above operation allows the user to download the contact information of a user, such as a business, professional service, or public institution, without the latter having to grant permission for the information download. This can be referred to as a "one-way" contact exchange. In this manner, the business, professional service, or institution can automatically transmit updated information to anyone who has downloaded its contact information, allowing for targeted advertising opportunities. Transmitted information can include, but is not limited to, address, phone, fax, email, hours of operation, services provided, forms, flyers, coupons, and promotional information. The end user retains the ability to "opt-in" or "opt-out" of receiving any promotional or non-demographic material.

In another embodiment, a contact exchange may take place between an existing user and a potential future user. To add the contact information for the potential future user, an existing user can add the potential future user's contact information similar to how the existing user would normally add an entry to an address book. This is considered a one-way connection established with a user account that does not exist in the system yet.

A placeholder account is then created for the potential future user and the account is deemed inactive. Therefore, the contact information is added to the existing user's account, but linked to the inactive account of the potential future user. Next, an invite can be sent to the potential future user for whom the inactive account was created. When the potential future member activates the inactive account, an invite is automatically extended to the user who added the contact information. Included in the invite is the meta-data of the contact information previously uploaded by the existing user as well as profiles shared.

Once a connection is established, the existing member can manually delete the information he, she, or it uploaded for the new user and can instead use the information shared by the new user. In another embodiment, the deletion of uploaded information will happen automatically. Therefore, the connection established will automatically turn that information into live information, subsequently controlled by the user who was added. This feature facilitates the availability of a non-user's contact information to a user.

In another embodiment, an introduction feature is used to introduce two or more contacts such that a profile exchange can happen between two users. It replaces the traditional "send the vCard" model and instead gives control to the user to decide what information to share with the introduced contact. The following are the steps involved in an introduction: (1) A user introduces the connections who may be two current users or a non-user and a current user; (2) the connections receive notifications from the user about the introduction; (3) the connections can choose to hide or can choose to initiate an invite, or accept an invite, in order to exchange profile(s) with the each other.

When an introducing user wishes to introduce a current user to a non-user, the non-user is sent an invite to the system, a placeholder account is created, and a notification of waiting introduction for the inactive account is created. Once the invited user joins by using the "invite code" or contact details (email or phone number) uploaded by the introducing user, the invited user automatically sees the introduction and can accept it. This triggers an invite to the current user to connect.

Group PIN

Another form of connecting is through a Group PIN feature. Generally, the Group PIN feature allows multiple users to share their contact information with each other by adding a single randomly generated unique PIN. It is useful for group settings where members are logically connected because of a location, profession, or purpose (e.g., classroom or business meeting). The server can maintain a list of users for each Group PIN that is created.

Some options for Groups types are based on the desired connectivity between members. For example, in some Groups, members will automatically connect to each other once they join a Group. Therefore, any user who adds the Group PIN and shares profile information is automatically connected to all other existing and future members of the group and receives the other members' contact information in an address book. In another example, members can join a Group, but not connect to any other member unless they actively choose to connect with a member.

Usually, members will be able to see all other members in a Group. However, in some embodiments, the Group may have a private list, wherein a moderator can see all of the members, but the members cannot see each other. One example of where this is helpful is where a doctor may wish to have patients join one Group in order to efficiently send a general message blast to the Group. In this embodiment, the doctor can reach all of the patients, but the doctor will not breach doctor-patient confidentiality by having the patients able to see information about each other.

In one embodiment, the Group membership may be open to the public. More specifically, the Group may operate similar to the yellow pages, wherein an individual outside of the Group can search within the Group to find a member. For example, an individual may wish to find intellectual property attorneys in New York City. That individual can find an open Group for New York City intellectual property attorneys and have access to the most recent contact information for members in that Group.

The Groups may also have different access controls. For example, some Groups may have a moderator that determines whether or not a user can join the Group. Therefore, a user may find the Group (ex: the moderator announces the Group PIN at an event) and then request access to the Group. In that embodiment, each member, before joining a group, must be approved by the moderator, and only after that approval may be able to get contact information about all the other members.

Other Groups may not have any moderator approval (i.e., an un-moderated mode) and may be accessible to any user who wishes to join the Group. The un-moderated mode can work in an ad-hoc setting and does not need a moderator to approve group members; any user who knows the Group PIN can join the group. A Group PIN can have an expiry time interval, after which new users can no longer join the group. Typically, the creator of an un-moderated group may set an expiry time interval so that all members must join the group in a defined timeframe. This helps prevent unsolicited access to users' contact information. The un-moderated mode is suitable for ad-hoc and spontaneous group (e.g., members in a meeting).

As described above, other features available for Groups are a search function and expiration time. Some Groups may be searchable to users of the system and other groups may only be accessible to users of the system through an invitation to join the Group. Some Groups may have an expiration time after which users of the system can no longer join and become members of the Group. In some embodiments, the Group itself, not just access to the Group, expires after a defined amount of time (ex: the Group is for a class that only meets for one semester, so the Group only exists for the duration of the semester). Other Groups may not have an expiration time.

When a user becomes a member of a Group, communication tools may become available to the new member. However, in some embodiments, the communication tools may only be available to a moderator of a Group. The communication tools available may include the ability to broadcast a text to a Group, to start a group chat, or to email all members of the Group.

In some embodiments, when a user adds a contact from a Group, the contact's information may be captured and the contact may be automatically placed into a folder labeled appropriately for the Group. If a label does not yet exist, the system may automatically create a label and folder for the contact or ask the user if the user wishes to have a label and folder created for the contact.

Figure 3:
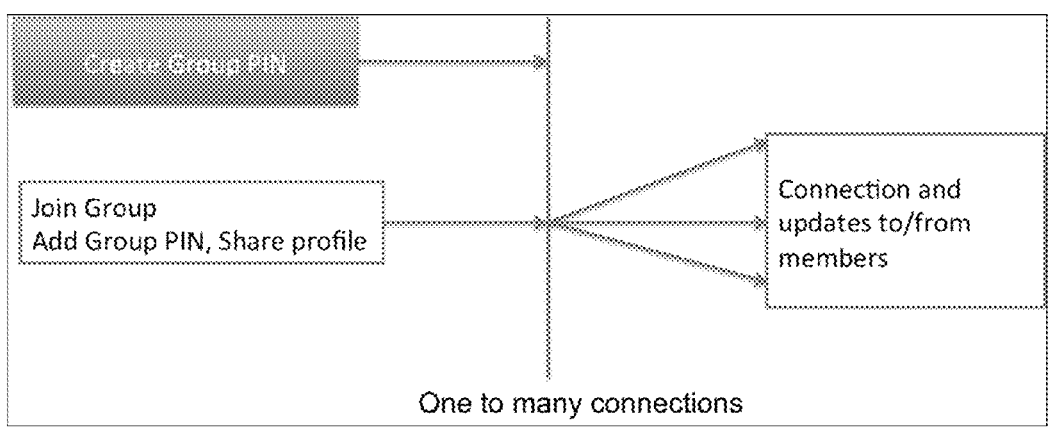
FIG. 3 illustrates a Group PIN flow diagram according to one embodiment of the disclosed system.

The following are the steps involved in one embodiment of Group PIN flow, as illustrated in FIG. 3: (1) A group leader, also known as a moderator, creates a new Group PIN and, if desired, sets an expiry time interval; (2) the moderator distributes (communicates) the Group PIN by e-mail, text, or physically/verbally; (3) users input the Group PIN and decide which of their profile(s) they wish to share with the group; (4) optionally, a moderator approves users' credentials to join the group based on profiles they shared; (5) users receive a notification about joining the group; (6) users receive contact information about other users in the group; and (7) users get the ability to share/unshare their profiles to a large group of users in a single action.

Account Creation and Maintenance

To use the system, a user must have a unique PIN. Therefore, when the user sets up a profile, the system generates a unique PIN for the user to enable sharing of personal and business contact information. The unique PIN can be a public identifier for a user, being easily readable and being easily memorable for a human user. The contact information can be included in a profile created on the system, and the profile may have dynamic field names and values created by user. By including the unique PIN and the profile, a first user can search for and identify a second user to which the first user can attempt to establish a connection, as described above.

The disclosed system can be used both on a fixed website and a mobile app. The interaction between the user and the system begins with creation of an account, wherein a user enters his or her first name, middle initial, and last name, an email address, and a secure password. In some embodiments, the name information inputted by the user is used to create the PIN. In one embodiment, the PIN generated is based on the alphabetical component of a unique seven character alphanumeric. For example, if the user's name is John Quincy Adams, the PIN will begin with the letters, "JQA." The user can then select four digits to complete the PIN. If the PIN is already taken, the user may be prompted to change the numerals or to choose from a few available options. In this case the PIN for user John Quincy Adams might be "JQA1776." Adams will now be able to use this PIN to exchange his contact information using the process described below.

After the successful creation of the PIN, the user may be prompted to complete and name one or more profiles, as illustrated in FIG. 1. The name of each profile can be, but is not limited to, family, work, school, class, sports team, company, organization, etc. Elements in each profile may include, but are not limited to, email address, mobile phone number, landline number, home address, work address, employer name, social media identifiers, etc. Digital photographs and audio clips can also be uploaded into each profile. This information may be saved in a master folder located on the website or mobile application, and may be available for editing at any time by the user. The master folder that contains the profiles can be named (for example: MY PROFILES) and can be easily navigated to on the website or mobile application.

For each profile, a security setting may be selected, allowing the user to determine which elements of the profile are available for site search (i.e., visible to other users who run a search and are not yet connected to the user) and for exchange with other users. In some embodiments, a default security setting may be initially set for a user.

As part of their profile, the user can also select keywords that may be used to route targeted ads, retail and ecommerce promotions, discount coupons, announcements, and updates to the user's Universe, a text and audiovisual feed updated in real time which the user accesses at will on the homepage. Unlike email and banner advertising, the user exerts complete control over what advertising and promotions he or she wants to receive, effectively eliminating spam. The feeds may be time stamped and, for future reference, can be saved in folders that are created and named by the user. These subfolders may be stored in a MY DEALS master file easily located on the website and mobile application. For example, if the user is interested in "French Food," ads and promotions from French restaurants and bakeries will be sent to the user for immediate review or storage. If a coupon has an expiration date associated with it, the time stamp can ensure that the user is notified of the impending expiration at a user specified time. If the coupon does expire, the user can choose an auto delete function, and the coupon will be removed from the folder. Otherwise, it can be manually deleted. The feeds in the user's Universe can be shared with the user's contacts and exported to his or her social media pages through share features for each entry. This allows for maximum dissemination of retail information.

In additional to individuals, the unique PINs can represent businesses of all kinds such as, but not limited to, public or private organizations and public or private service providers. Profiles for businesses can represent business information like products, services, deals, coupons, and promotions. Changes in business profiles can represent changes in products or service availability or status of deals, coupons, and promotional information.

The unique PIN, in a preferred embodiment, is used to initiate a connection, and users can search and retrieve others' unique PINs to initiate communication and invite connections, as illustrated in FIG. 1. Users can also search for other contacts by name and other information types such as, but not limited to, title, position, company, business or service descriptors, personal interests, hobbies, likes, dislikes, nationality, gender, ethnicity, and geographical location.

Contact Organization

Entries in a user's address book can be labeled in order to logically group the entries. For example, a user can aggregate and store contacts separately from the main contact list according to user-defined labels. Therefore, a user can easily access contacts by selecting the appropriate user-defined label. Once an entry has occurred, the user can export the entry to a mobile phone, a computer, a server, or other forms of contact information utilities. Further, the contacts residing in a mobile phone, a computer, a server, or other forms of contact information utilities can be imported into a new system contact list and can be invited to download the new contact utility.

Users can organize the various contact information or parts of contact information into sub-lists, which can be created and labeled at the user's discretion. Examples of labels may include, but are not limited to, family, work, school, class, club team, company, and organization. Any or all of the contacts in a sub-list may be segregated from the main contact list or incorporated into it at the discretion of the user. In this way, contact directories can be created and maintained independently from a user's main contact list to prevent the main list from containing entries that are infrequently or never accessed.

Figure 4:
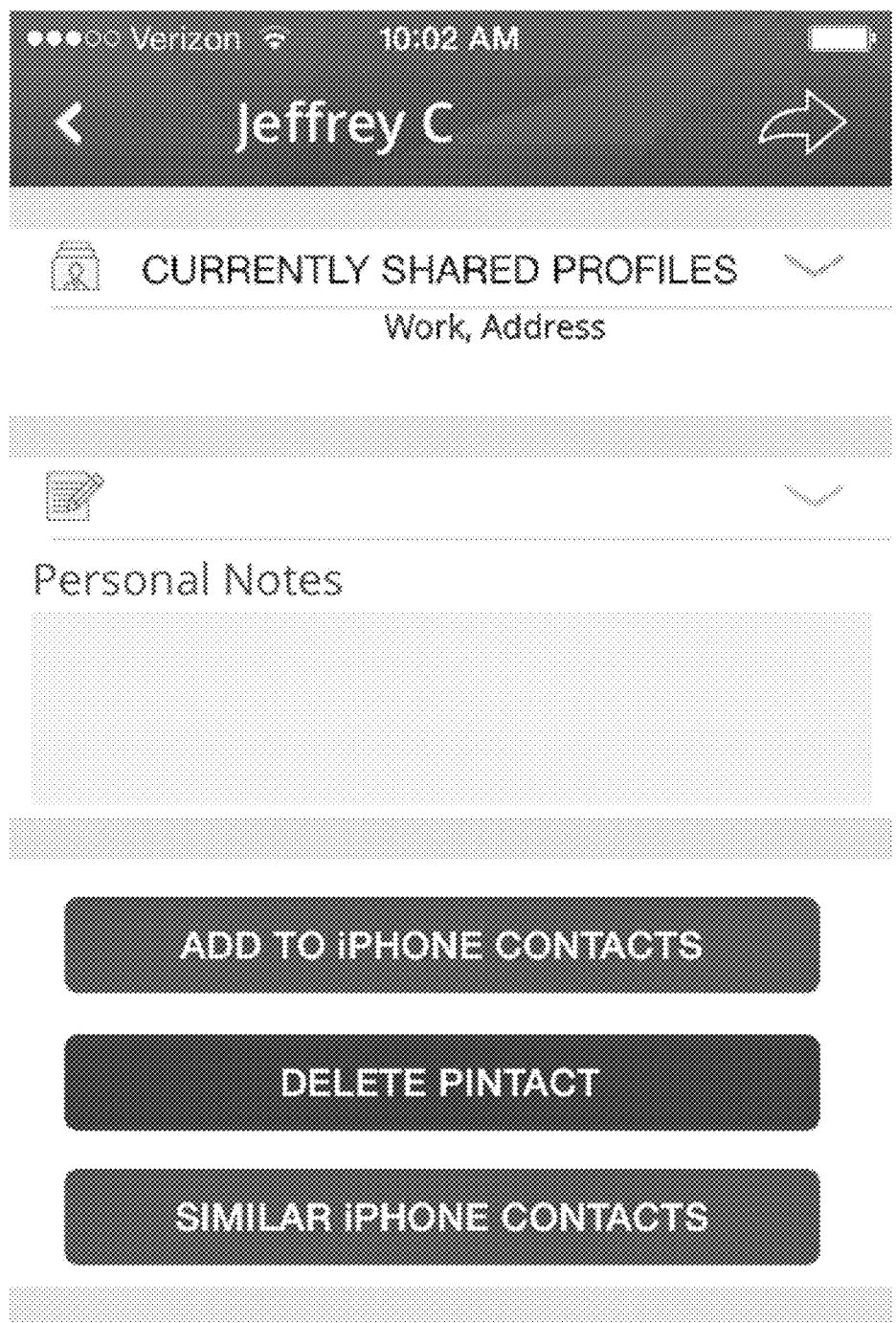
FIG. 4 is an example graphical user interface showing a mobile interface contact profile screen according to one embodiment of the disclosed system.

The information sent and/or received for each contact can be aggregated into one single entry ("business mode"), as illustrated in FIG. 4, or presented as separate standalone units of contact information ("social mode"). For example, if USER1 requests USER2's contact information, and USER2 sends a work, school, and business profile, the various data elements can be combined into a single contact profile entitled "USER2" in USER1's contact list. Alternatively, USER1 can choose to display USER2's various profiles separately under USER2's name in the contact list.

A user can sort his or her contacts into folders, which can be created and named at the user's discretion. Examples of folders may include family, work, school, team, etc. The information received for each contact can be aggregated into one single entry. For example, if USER1 requests USER2's contact information, and USER2 sends a work, school and business profile, the various data elements may be combined into a single contact profile entitled "USER2" in USER1's contact list. Contact information within the system may be updated in real time. For example, if USER2 changes any data element in any public profile, that change may be automatically updated in USER1's contact list. A notification with the updated information can be sent to USER1's Universe and a data trail can be maintained that tracks the history of every single data element change.

Data within the system can be synced with smartphone contact books, Outlook, Gmail Contacts, etc. Data fields in the system application may be "live" so that phone numbers can be dialed using the system, and email addresses can be populated into an outgoing email message. Incoming telephone numbers that are not already part of the directory can be added to a user's contacts.

Contact Updates

If a user changes any data element in any shared profile, that change is automatically reflected in a contact's contact list. A notification indicating what information was changed is sent to the contact and a data trail is maintained, tracking the history of every single data element change. More specifically, when a user updates his or her profile, the system generates a fan out write to the notification feed of all the user's contacts. In some embodiments, profile updates for a plurality of users are consolidated into a single update notification.

In some embodiments, a dynamic, sortable compilation of each user's inbound and outbound requests is easily accessible (for example, in a MY REQUESTS folder in an area on the website and mobile application that is easily navigable, such as a sidebar or homepage). A history of contacts accepted and rejected may be stored and accessible by any user. In addition, the profile and contact information that the user has shared may also be stored and available for review. This data trail can help remind the user which information was sent to whom and when. For example, if USER1 initially shares his or her work information with USER2 and, after a time they become social friends, USER1 can recall the history of the initial data exchange, and then proceed to send additional social and other personal contact information to USER2 without repeating what was already sent. USER2 in this secondary interaction is notified of the new information added to his contact list, but is not obligated to send any return information. This new data exchange is recorded, timed stamped, and accessible by both USERS for review at a later time. Subsequently, any changes in the data exchanged previously may be automatically updated to the recipients' account without any action from sender or receiver.

As a user's contact list grows, the contact list may contain one or more duplicate entries corresponding to a single contact. The system can identify these duplicates by using a matching algorithm. For example, the matching algorithm can compare the user's contacts' e-mail address(es), phone number(s), and first and last names to identify a match. Two entries are considered matched if one of the following exists: (1) the first names match and any of the e-mail addresses match; (2) the first names match and any of the phone numbers match; (3) the initial part of both first names match, the last names match, and any of the phone numbers or email addresses match.

Figure 5:
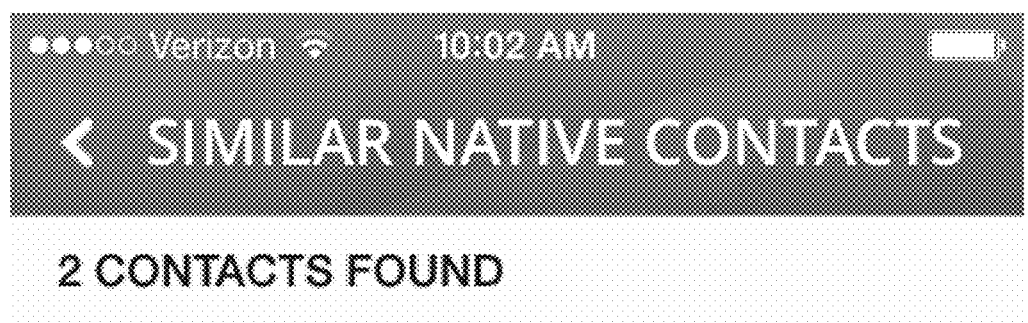
FIG. 5 is an example graphical user interface showing a mobile interface duplicate entries screen according to one embodiment of the disclosed system.

When a match is made, it can be added to a data structure representing similar contacts. It can also be displayed to a user on a screen, as illustrated in FIG. 5. Therefore, entries are de-duplicated or consolidated from a user's contact list view and are displayed together within one corresponding entry.

Other Benefits and Advertising

One benefit of the disclosed system is that it can be leveraged to infer users' interests. For example, entries in an address book (e.g., connections for social activity, entries for food and entertainment, etc.) can be used to infer the interests of user. Each entry can represent a set of interests that are directly stated or that are inferred from other social platforms (e.g., information about an activity with a connection can be fetched from Foursquare or Facebook). A union of such direct and inferred interests can represent the overall interests of a user. Such interests of a user can be useful for advertisements, promotions, etc.

The contact book is one aspect of a person's electronic fingerprint that has yet to be tapped for targeting advertising activities. Over time, an individual accumulates hundreds, if not thousands, of personal, professional, retail, social, entertainment, and community contacts. This information becomes a "virtual fingerprint" or "unique signature," uniquely identifying a person's interests and interactions with precision. Changes or evolution of this "virtual fingerprint" indicates a change in interest with time. By facilitating information exchange through an "electronic rolodex" and selectively and securely providing targeted advertising opportunities, promotions, coupons, etc., the user can now filter and receive only information of interest. Advertisers, corporations, and retailers may now transmit information to an end user who is truly interested in the type of information, leading to a higher probability of triggering a transaction.

Currently, advertising is the primary source of revenue generated by most of the social media sites on the Internet. Improving targeted advertising (i.e., properly and efficiently matching the web ad with the specific interests of the user in hopes of generating an electronic or brick and mortar purchase) is the subject of intense investigation. Profiling a user based on his or her browsing habits, prior electronic purchases, social media pages or email exchanges are all methods currently under employ to match web ads with the proper demographic.

One benefit of the disclosed system is the multistep process whereby a user's interests can be successfully matched with advertising by inferring a user's interests based on his/her contact lists. Another benefit is that the system can increase the efficiency of electronic data exchange over the Internet, can facilitate ecommerce, can streamline corporate human resource functions, and can efficiently distribute information over social media sites.

Linking the system to selected contact information has widespread potential use in other computer applications, ecommerce, retail, print advertising, TV advertising, radio advertising, and as a corporate human resources function. These applications are described below.

In some embodiments, the recipient of an email can retrieve contact information from the PIN in the signature of e-mail. For example, automatic signature contact information (vCard) at the end of emails currently has to be entered manually into an email utility contact list. By inclusion of a user's PIN at the end of the user's signature in a specified data field, the user's contact information can be entered automatically. After hitting enter, the user's automatic signature information can be uploaded to the email utility contact list as well as a mobile application implementing the system.

In one embodiment, a user can share business card information by sharing the user's PIN. For example, a user can include the user's PIN on a printed business card to allow for upload of the user's contact information via the fixed website or mobile application. By default setting, the owner of the business card may not have to accept the request for the upload, but will be notified of the upload.

In another embodiment, a consumer that visits a retail store may wish to upload information about the establishment into his or her Smartphone. To meet this need, the retailer can establish a Corporate Account listing, for example, the contact information of the establishment, the hours of operation, directions to the establishment, the staff directory, the menu, the list of services, etc. A retailer's PIN number can also be linked to the establishment in outside search engine queries, which allows for contact information to be remotely uploaded. Other advertising material such as stickers and signage containing the name and PIN of the establishment, as well as QR code if available, can be prominently displayed so a user can easily upload the information.

Businesses can also use their PIN for other forms of advertising and content download by including the PIN in, for example, print ads in newspapers, magazines, and flyers, by including the PIN in, for example, TV ads, restaurant or product reviews, and infomercials, and by including the PIN in, for example, realtor information on vacant properties. By including a PIN, advertiser's retail information, downloadable contact, product, and coupon information, and realtor information, can be quickly uploaded to a website or smartphone for subsequent access by a user.

Entertainment personalities wishing to advertise can also benefit by having a PIN. For example, TV and radio talk show hosts and guests, newscasters, and other TV or radio personalities can have their PIN announced or displayed along with their respective social media contacts for upload to website and mobile app. This allows for easier aggregation and storage of information from media.

In another use example, new employees of a corporation can share their PIN with the corporation's human resources to accurately relay important personal information. Alternatively, a corporation can assign a new Corporate PIN to the employee. The corporation can then sponsor the employee's work profile, populating it with the corporate logo and the employee's title information and precisely positioning specific information. Employees' information can be located by entering an employee PIN on the corporation's website. The corporation can then monitor the employee's business card distribution to assess productivity. The corporation can also distribute information to its employees' contacts that have downloaded the employees' corporate contact information.

If an employee voluntarily leaves the corporation or is terminated, the employee's work profile page can be expunged and no longer be downloadable. Further, a message can be sent to the former employee's contacts that the corporation no longer employs the employee.

Hardware and Software

Figure 6:
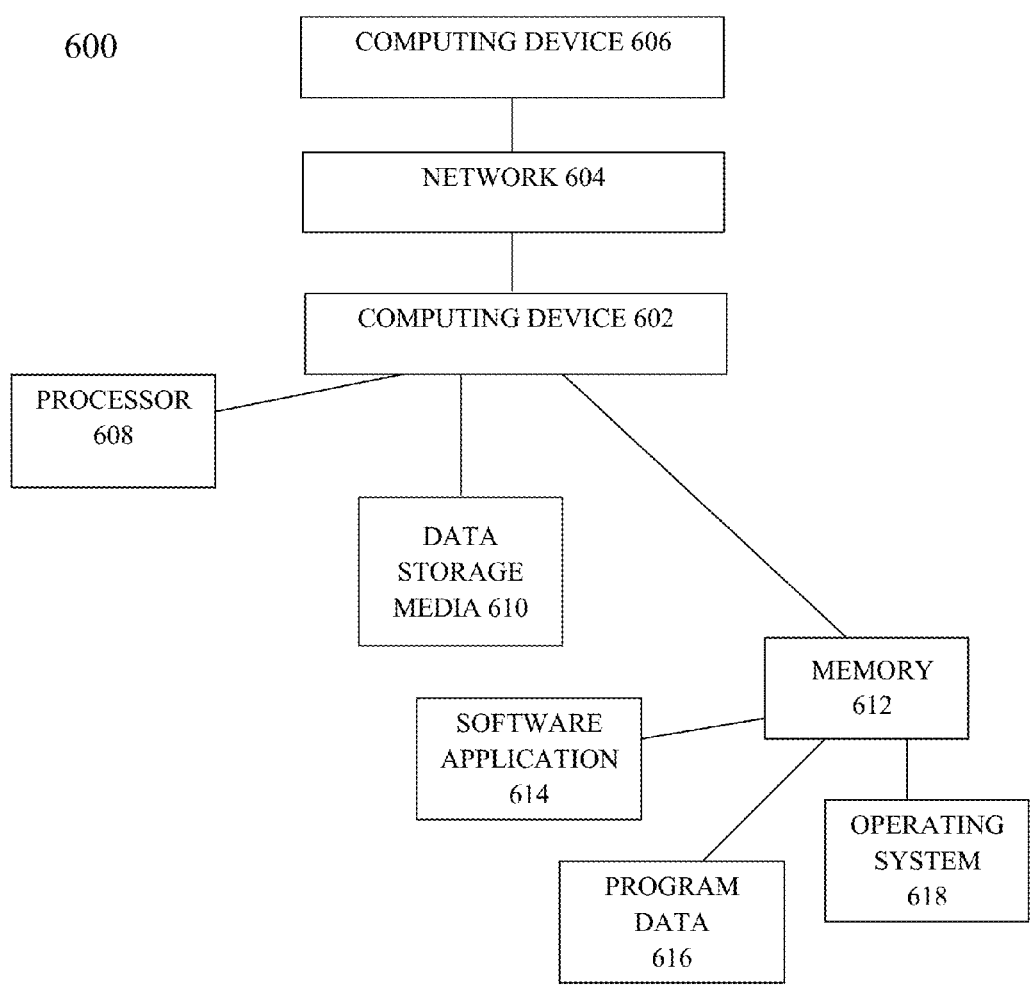
FIG. 6 is a schematic block diagram depicting an example computing system used in accordance with one embodiment of the disclosed system.

In some embodiments, the system described herein uses a computing system to carry out the various functions described herein. FIG. 6 is a schematic block diagram of an example computing system 600. The example computing system 600 includes at least one computing device 602. In some embodiments the computing system 600 further includes a communication network 604 and one or more additional computing devices 606 (such as a server).

The computing device 602 can be, for example, located in a user's home or other place of business. In some embodiments, computing device 602 is a mobile device. The computing device 602 can be a stand-alone computing device or a networked computing device that communicates with one or more other computing devices 606 across a network 604. The additional computing device(s) 606 can be, for example, located remotely from the first computing device 602, but configured for data communication with the first computing device 602 across a network 604.

In some examples, the computing devices 602 and 606 include at least one processor or processing unit 608 and system memory 612. The processor 608 is a device configured to process a set of instructions. In some embodiments, system memory 612 may be a component of processor 608; in other embodiments system memory 612 is separate from the processor 608. Depending on the exact configuration and type of computing device, the system memory 612 may be volatile (such as RAM), non-volatile (such as ROM, flash memory, etc.) or some combination of the two. System memory 612 typically includes an operating system 618 suitable for controlling the operation of the computing device 602, such as the WINDOWS® operating systems or the OS X operating system, or a server, such as Windows SharePoint Server, also from Microsoft Corporation, or such as a Macbook with OS X. The system memory 612 may also include one or more software applications 614 and may include program data 616.

The computing device 602 may have additional features or functionality. For example, the computing device 602 may also include additional data storage devices 610 (removable and/or non-removable) such as, for example, magnetic disks, optical disks, or tape. Computer storage media 610 may include volatile and nonvolatile, removable and non-removable media implemented in any method or technology for storage of information, such as computer readable instructions, data structures, program modules, or other data. System memory, removable storage, and non-removable storage are all examples of computer storage media. Computer storage media 610 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 602. An example of computer storage media 610 is non-transitory media.

In some examples, one or more of the computing devices 602 and 606 can be located in an establishment. In other examples, the computing device 602 can be a personal computing device that is networked to allow the user to access and utilize the system disclosed herein from a remote location, such as in a user's home, office or other location. In some embodiments, the computing device 602 is a smart phone tablet, laptop computer, personal digital assistant, or other mobile device. In some embodiments, system operations and functions are stored as data instructions for a smart phone application. A network 604 facilitates communication between the computing device 602 and one or more servers, such as an additional computing device 606, that hosts the system. The network 604 may be a wide variety of different types of electronic communication networks. For example, the network 604 may be a wide-area network, such as the Internet, a local-area network, a metropolitan-area network, or another type of electronic communication network. The network 604 may include wired and/or wireless data links. A variety of communications protocols may be used in the network 604 including, but not limited to, Wi-Fi, Ethernet, Transport Control Protocol (TCP), Internet Protocol (IP), Hypertext Transfer Protocol (HTTP), SOAP, remote procedure call protocols, and/or other types of communications protocols.

In some examples, the additional computing device 606 is a Web server. In this example, the first computing device 602 includes a Web browser that communicates with the Web server to request and retrieve data. The data is then displayed to the user, such as by using a Web browser software application. In some embodiments, the various operations, methods, and functions disclosed herein are implemented by instructions stored in memory. When the instructions are executed by the processor 608 of the one or more computing devices 602 or 606, the instructions cause the processor 608 to perform one or more of the operations or methods disclosed herein.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A method for replication of information between databases, the method comprising:
   utilizing a computing device having a processing device and a memory device, the computing device storing instructions that, when executed by the processing device, causes the processing device to:
   allow a first user to create a profile through a web-based content management system, wherein the profile contains the first user's contact information;
   distribute a PIN to the first user, wherein the PIN is associated with the first user's profile;
   allow the first user to send the PIN to a second user through the web-based content management system, wherein the second user also has a PIN and a profile that contains contact information;
   accept an entry by the second user of the first user's PIN, wherein entry of the first user's PIN by the second user results in the processing device sending a connection request to the first user;
   notify the first user of the request;
   accept an acceptance of the request by the first user;
   connect the first user and the second user;
   save the first user's profile and contact information in the second user's address book;
   save the second user's profile and contact information in the first user's address book;

replicate changes to the first user's contact information in the second user's address book when the first user updates the first user's contact information.

2. The method of claim 1, wherein the computing device causes the processing device to save historical information about the connection between the first user and the second user and to display, on a screen, the historical information to the first or second user.

3. The method of claim 1, wherein the contact information is selected from the list consisting of an email address, a phone number, an address, an employer name, a social media identifier, a digital photograph, an audio clip, a title, a position, a business descriptor, a personal interest, a hobby, a like, a dislike, a nationality, a gender, an ethnicity, and a geographical location.

4. The method of claim 3, wherein the computing device causes the processing device to allow the first user to create a second profile.

5. The method of claim 4, wherein the computing device causes the processing device to allow the first user to choose a profile to share with the second user after the first user and the second user are connected.

6. The method of claim 1, wherein the computing device further causes the processing device to:
   accept a manual entry of a third user's contact information into the first user's address book;
   create an inactive account for the third user;
   send an invitation to third user;
   accept an acceptance of the invitation by the third user;
   activate the inactive account;
   accept an update to the third user's contact information by the third user;
   send an invitation to the first user to update the first user's manual entry of the third user's contact information;
   accept an acceptance of the invitation by the first user; and
   automatically update the third user's contact information in the first user's address book to reflect the third user's update.

7. The method of claim 1, wherein the computing device further causes the processing device to:
   create an introduction request for a third and a fourth user;
   send a notification of the introduction request to the third and the fourth user;
   accept an acceptance of the request by the third and the fourth user;
   save the fourth user's profile and contact information in the third user's address book; and
   save the third user's profile and contact information in the fourth user's address book.

8. The method of claim 1, wherein the computing device further causes the processing device to:
   allow the first user to create a group profile through the web-based content management system;
   distribute a group PIN to the first user, wherein the group PIN is associated with the group profile; and
   accept an entry by a third user of the group PIN, wherein the third user has a profile and entry of the group PIN by the third user results in the processing device connecting the third user to the group.

9. The method of claim 8, wherein the computing device further causes the processing device to:
   accept entries by a plurality of users of the group PIN, wherein each of the plurality of users has a profile and entry of the group PIN by the plurality of users results in the processing device connecting the plurality of users to the group;
   connect the third user to the plurality of users;
   save the third user's profile and contact information in the plurality of users' address books;
   save the plurality of users' profile and contact information in the third user's address book; and
   replicate changes to the third user's contact information in the plurality of users' address books when the third user updates the third user's contact information.

10. The method of claim 8, wherein the computing device further causes the processing device to:
    accept entries by a plurality of users of the group PIN, wherein each of the plurality of users has a profile and entry of the group PIN by the plurality of users results in the processing device connecting the plurality of users to the group;
    allow the third user to view the plurality of users and to send a request to at least one of the plurality of users;
    notify the at least one of the plurality of users of the request;
    accept an acceptance of the request by the at least one user;
    connect the third user and the at least one user;
    save the third user's profile and contact information in the at least one user's address book;
    save the at least one user's profile and contact information in the third user's address book; and
    replicate changes to the third user's contact information in the at least one user's address book when the third user updates the third user's contact information.

11. The method of claim 8, wherein the computing device further causes the processing device to close the group after a pre-determined amount of time.

12. The method of claim 1, wherein the computing device further causes the processing device to:
    allow the first user to create a group profile through the web-based content management system;
    distribute a group PIN to the first user, wherein the group PIN is associated with the group profile; and
    accept an entry by a third user of the group PIN, wherein the third user has a profile;
    notify the first user of the entry of the group PIN by the third user;
    allow the first user to approve the entry of the group PIN by the third user; and
    connect the third user to the group.

13. The method of claim 1, wherein the computing device further causes the processing device to identify duplicate entries in the first user's address book and consolidate them.

* * * * *